United States Patent [19]
Gebreselassie et al.

[11] Patent Number: 6,124,222
[45] Date of Patent: Sep. 26, 2000

[54] MULTI LAYER HEADLINER WITH POLYESTER FIBER AND NATURAL FIBER LAYERS

[75] Inventors: Girma M. Gebreselassie, Southfield; Roger B. Michna, St. Clair Shores; Harold G. Wolf, Jr., Gibraltar, all of Mich.

[73] Assignee: Lear Automotive Dearborn, Inc., Southfield, Mich.

[21] Appl. No.: 08/889,537

[22] Filed: Jul. 8, 1997

[51] Int. Cl.$^7$ ................................. B60J 7/00; B32B 3/00
[52] U.S. Cl. ...................... 442/389; 296/214; 296/39.1
[58] Field of Search ................. 296/214, 39.1; 428/218, 157; 442/389

[56] References Cited

U.S. PATENT DOCUMENTS

| | | | |
|---|---|---|---|
| 1,923,512 | 8/1933 | Stein | 154/2 |
| 1,968,531 | 7/1934 | Ledwinka | 296/137 |
| 2,331,321 | 10/1943 | Heaton | 28/4 |
| 2,674,488 | 4/1954 | Lyijynen et al. | 296/137 |
| 2,763,586 | 9/1956 | Noyes | 154/53 |
| 3,042,446 | 7/1962 | Stahl | 296/137 |
| 3,126,978 | 3/1964 | Bergstrom | 181/33 |
| 3,160,549 | 12/1964 | Caldwell et al. | 161/161 |
| 3,212,811 | 10/1965 | Strasser | 296/137 |
| 3,265,530 | 8/1966 | Marzocchi et al. | 161/203 |
| 4,172,918 | 10/1979 | Deerer | 428/174 |
| 4,195,112 | 3/1980 | Sheard et al. | |
| 4,211,590 | 7/1980 | Stewart et al. | 156/79 |
| 4,256,797 | 3/1981 | Stamper et al. | 428/215 |
| 4,320,167 | 3/1982 | Wishman | 428/288 |
| 4,352,522 | 10/1982 | Miller | 296/214 |
| 4,363,848 | 12/1982 | Le Duc et al. | 428/286 |
| 4,451,315 | 5/1984 | Miyazaki | 156/220 |
| 4,474,846 | 10/1984 | Doerer et al. | 428/284 |
| 4,610,478 | 9/1986 | Tervol | 296/214 |
| 4,741,945 | 5/1988 | Brant et al. | 428/158 |
| 4,803,112 | 2/1989 | Kakimoto et al. | |
| 4,840,832 | 6/1989 | Weinle et al. | |

FOREIGN PATENT DOCUMENTS

| | | |
|---|---|---|
| 0373135 | 6/1990 | European Pat. Off. |
| 2615793 | 10/1977 | Germany |
| 3335669 | 5/1985 | Germany |
| 3811778 | 11/1988 | Germany |
| 19602551 | 8/1997 | Germany |
| 1149270 | 4/1969 | United Kingdom |
| 9806600 | 2/1998 | WIPO |

OTHER PUBLICATIONS

Database WPI, Section Ch, Week 8932 Derwent Publications Ltd; Class A95, AN 89–232257 XP002079958.
Database WPI, Section Ch, Week 9007, Derweent Publications Ltd; Class A35, AN 90–047825 XP002079959.

*Primary Examiner*—Daniel Zirker
*Attorney, Agent, or Firm*—MacMillan, Sobanski & Todd, LLC

[57] ABSTRACT

A plurality of vehicle headliners are disclosed formed of a number of different layers. Each headliner includes at least a layer formed of a mixture of binder and non-binder polyester fibers. Each of the headliners also include a cover stock layer. Several of the disclosed embodiments include natural fiber layers which provide additional strength. The inventive headliners are more recyclable than the prior art, and are less irritating to the skin due the elimination of fiberglass.

3 Claims, 2 Drawing Sheets

MULTI LAYER HEADLINER WITH POLYESTER FIBER AND NATURAL FIBER LAYERS

BACKGROUND OF THE INVENTION

This invention relates to improvements in headliners.

Vehicle headliners are typically placed along the ceiling of a vehicle. Headliners include a plurality of layers of distinct materials designed to, in combination, absorb sound, have rigidity and strength and also to provide a pleasing visual appearance. Typically, a number of layers of different materials are used to achieve the various desired properties. Often, fiberglass layers are used. There is a desire to eliminate fiberglass in headliners as it irritates assembly workers.

Headliners also desirably have sufficient flexibility such that they may be slightly bent upon insertion into the vehicle without damage. There are some headliner configurations which are so stiff, that if a corner bumps into a component of the vehicle frame, as an example, when the headliner is being mounted in the vehicle, the headliner may crack.

Headliners are known which allow flexibility and resilience such that they will not become damaged if they do bump into a vehicle frame component. However, these headliners have typically been more proposals than actual production quality headliner materials. In general, these proposals have been unduly simplistic, and would not achieve all of the modern functional requirements of a headliner.

SUMMARY OF THE INVENTION

Several disclosed headliner constructions each include a first layer formed of a polyester substrate. The polyester substrate is preferably formed of a mixture of binder and non-binder polyester fibers. The binder fibers melt upon application of heat, and bond the fibers of the two types to each other. By increasing the amount of binder fibers relative to non-binder fibers the stiffness of the layer can be controlled.

In addition, natural fiber layers are also preferably included intermediate and adjacent to the polyester fiber layers. The natural fiber layers provide additional strength and further allow the designer greater freedom in achieving specific goals for the headliner construction.

Preferably, a cover stock material is applied on one side of the headliner to provide a desired visual appearance.

By using only polyester and natural fibers, the headliner eliminates undesirable characteristics of the known fiberglass layers.

These and other features of the present invention can be best understood from the following specification and drawings, of which the following is a brief description.

DETAILED DESCRIPTION OF A PREFERRED EMBODIMENT

Figure 1:
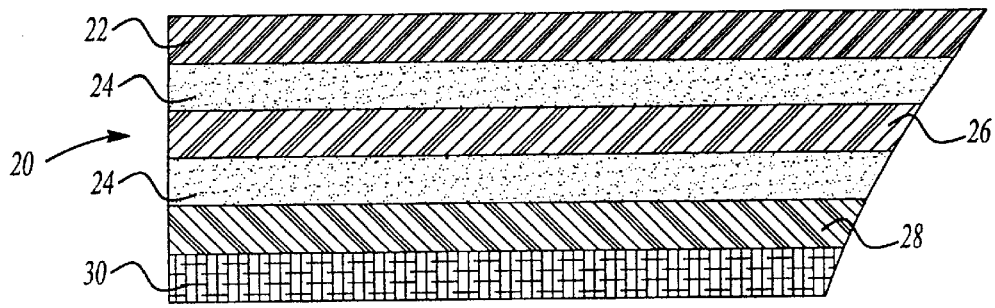
FIG. 1 shows a first embodiment headliner according to the present invention.

A first headliner 20 is shown in FIG. 1. An outer cover stock 22 which preferably may be formed of polyester based materials is secured by a adhesive layer 24 to a polyester substrate 26. A second adhesive layer 24 secures substrate 26 to a second polyester substrate 28. A layer 30, which may be a natural fiber layer formed of chicopee, or other natural fiber, is attached to an outer face of the polyester substrate. Examples of other natural fibers for the natural fiber layers include hemp, sisal, or other known materials.

As described above, it is known to provide layers in a headliner formed of polyester fibers wherein the layer is formed of a mixture of binder and non-binder polyester fibers. Examples of suitable materials are disclosed in U.S. Pat. No. 4,195,112. A preferred construction for use in headliners is disclosed in co-pending applicant Ser. No. 08/868,312, filed Jun. 3, 1997, and entitled "Vehicle Headliner Formed of Polyester Fibers".

The natural fiber layer provides additional rigidity and strength to the overall headliner construction. The polyester layers 26 and 28 can be formed to have differing amounts of binder fibers such that different results can be achieved with the final headliner material.

Figure 2:
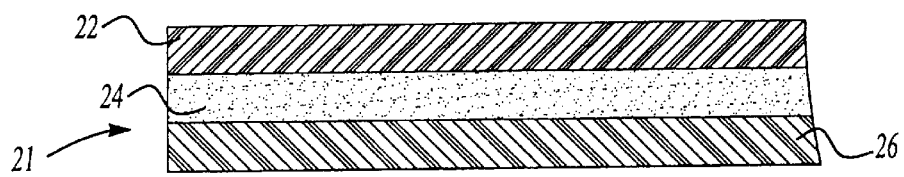
FIG. 2 shows a second embodiment headliner according to the present invention.

FIG. 2 shows a second embodiment 21 wherein the cover stock 22 is attached by an adhesive layer 24 directly to the polyester substrate 26. Again, the polyester substrate is formulated to achieve the desired features for the particular headliner.

Figure 3:
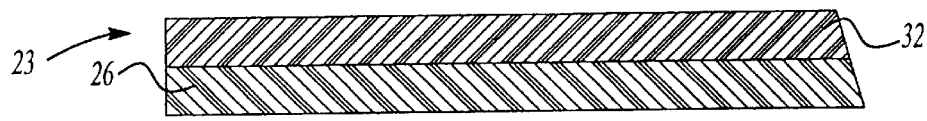
FIG. 3 shows a third embodiment headliner according to the present invention.

FIG. 3 shows a simplified headliner wherein the cover stock has a prelaminated adhesive on one surface such that it may be attached directly to the polyester substrate 26.

Figure 4:
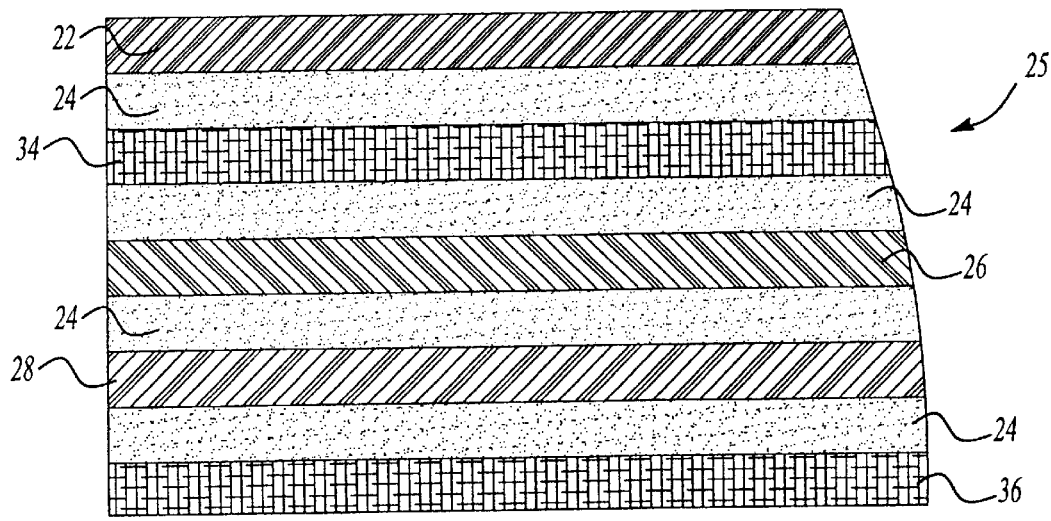
FIG. 4 shows a fourth embodiment headliner according to the present invention.

FIG. 4 shows a fourth embodiment headliner 25, wherein the cover stock 22 is again secured through an adhesive layer 24 to a natural fiber layer 34. The natural fiber layer is secured through a second adhesive layer 24 to a polyester substrate 26, which is in turn secured through an adhesive layer 24 to a second polyester substrate 28. Polyester substrate 28 is secured through an adhesive layer 24 to a natural fiber layer 36. The natural fiber layers 34 and 36 may be formed of chicopee, or any other natural fiber layer which has the desired strength. Again, the combination of the several layers provide a headliner which has the desired rigidity, and sound absorption, while at the same time is not as brittle as the prior art headliners.

Figure 5:
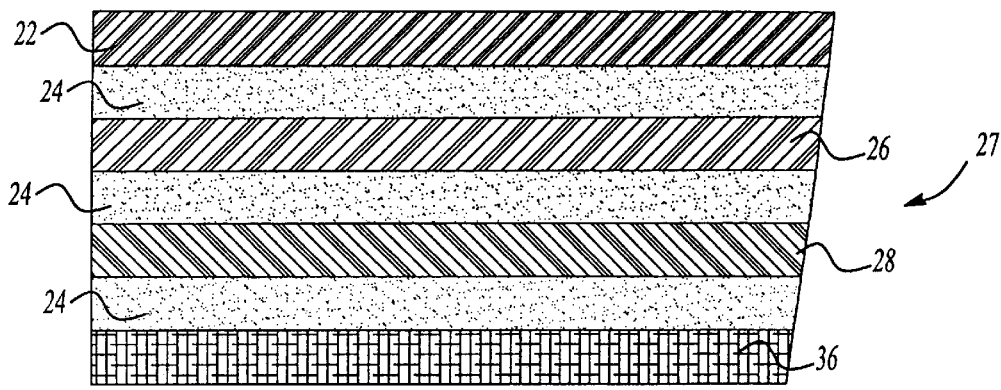
FIG. 5 shows a fifth embodiment headliner according to the present invention.

FIG. 5 shows another headliner embodiment 27 which includes cover stock layer 26 secured by an adhesive layer 24 to the polyester substrate 26. A second adhesive layer 24 secures the polyester substrate 26 to a polyester substrate 28. Another adhesive layer 24 secures substrate 28 to a natural fiber layer 36.

Figure 6:
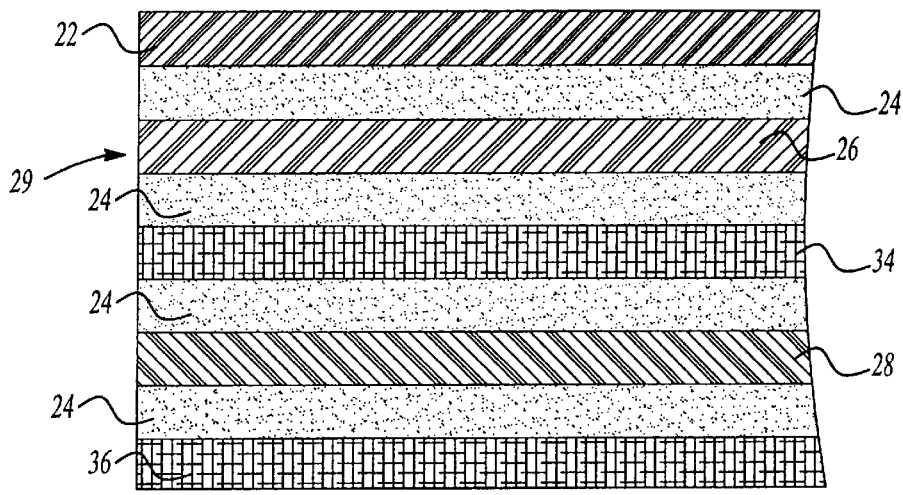
FIG. 6 shows a sixth embodiment headliner according to the present invention.
Figure 7:
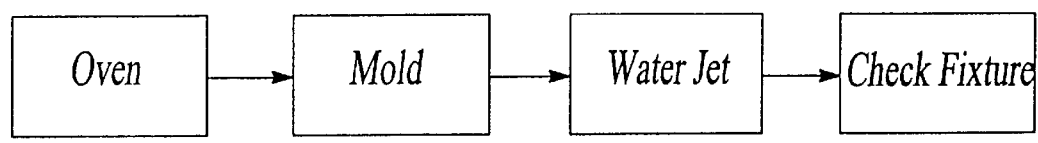
FIG. 7 schematically shows the method steps for forming a headliner according to the present invention.

FIG. 6 shows yet another headliner construction 29. Cover stock 20 is again secured by an adhesive layer 24 to a polyester substrate 26. Polyester substrate 26 is secured by an adhesive layer 24 to a natural fiber layer 34. Natural fiber layer 34 is secured by adhesive layer 24 to a second polyester substrate layer 28. Substrate layer 28 is secured by an adhesive layer 24 to a further natural fiber layer 36.

It is preferred that the adhesives are formed of polyester based adhesives such that the bulk of the plastic materials in any one of the headliner embodiments of this invention are formed of polyester, and such that scrap from the headliner may be easily recyclable. The present invention has benefits in that it is more easily recyclable than the prior art headliners which included a number of different types of plastic materials. Further, by substituting polyester and natural fibers for the prior art fiberglass layers, the headliners are less irritating to work with, and thus have several beneficial properties.

FIG. 6 schematically shows a method for forming any one of the headliners of the present invention. The several layers are assembled together, but have not yet been bonded together. The layers are passed into an oven which heats the headliner layers to a sufficient temperature to activate the several adhesive layers. From the oven, the headliner is then moved into a mold where it is molded to its desired shape. In the oven, the layers are bonded together, and in the mold they are shaped to a desired shape for the headliner. The shaped headliner is then moved to a water-jet cutting station which cuts the headliner to the desired final shape for the vehicle. The recyclable due to the present invention. From the water-jet cutting station, the cut headliner then moves to a fixture which checks the final shape to ensure that it is as desired.

The use of the oven eliminates wet binder processes which have been utilized in the past to form the several headliner layers into a headliner. Further, the invention reduces the cycle time, the manpower necessary and the space required. The elimination of the wet binder layers also eliminates pollutants into the air that are found when wet binders are utilized.

The polyester substrates can be needle punched, or could be extruded layers. The substrate density is preferably between 700 g/m$^2$ to 2200 g/m$^2$.

Several embodiments of the present invention have been disclosed, however, a worker of ordinary skill in the art would recognize that certain modifications would come within the scope of even these several embodiments. For that reason the following claims should be studied to determine the true scope and content of this invention.

What is claimed is:

1. A vehicle headliner comprising:
   at least one cover stock layer;
   a pair of natural fiber layers; and
   a pair of polyester substrate layers each formed of a mixture of binder and non-binder polyester fibers, a first of said natural fiber layers being spaced by an adhesive layer from said cover stock layer, and said first of said natural fiber layers being spaced by an adhesive layer from a first one of said polyester substrate layers, said first polyester substrate layer being spaced by an adhesive layer from a second one of said polyester substrate layers, and another adhesive layer being placed between said second polyester substrate and a second one of said natural fiber layers.

2. A vehicle headliner comprising:
   at least one cover stock layer;
   a pair of polyester substrate layers each formed of a mixture of binder and non-binder polyester fibers; and
   a natural fiber layer, a first adhesive layer being positioned between said cover stock and a first of said polyester substrate layers, a second adhesive layer being positioned between said first and second polyester substrate layers, a third adhesive layer being positioned between said second polyester substrate and said natural fiber layer.

3. A vehicle headliner comprising:
   at least one cover stock layer;
   a pair of polyester substrate layers each formed of a mixture of binder and non-binder polyester fibers; and
   a pair natural fiber layers, with a first adhesive layer being positioned between said cover stock layer and a first of said polyester substrate layers, a second adhesive layer being positioned between said first polyester substrate layer and a first of said natural fiber layers, a third adhesive layer being positioned between said first natural fiber layers and a second of said polyester substrate layers and a fourth adhesive layer being positioned between said second polyester substrate layer and a second of said natural fiber layers.

* * * * *